US012625903B1

(12) United States Patent
Hu et al.

(10) Patent No.: US 12,625,903 B1
(45) Date of Patent: May 12, 2026

(54) METHOD FOR PRESENTING INTERACTIVE INFORMATION, ELECTRONIC DEVICE AND STORAGE MEDIUM

(71) Applicant: SERENDIPITY ONE INC, Sammamish, WA (US)

(72) Inventors: Ning Hu, Sammamish, WA (US); Zhenyu Lu, Sammamish, WA (US)

(73) Assignee: SERENDIPITY ONE INC., Sammamish, WA (US)

( * ) Notice: Subject to any disclaimer, the term of this patent is extended or adjusted under 35 U.S.C. 154(b) by 0 days.

(21) Appl. No.: 18/967,591

(22) Filed: Dec. 3, 2024

(51) Int. Cl.
*G06F 16/438* (2019.01)
*G06F 16/435* (2019.01)

(52) U.S. Cl.
CPC .......... *G06F 16/438* (2019.01); *G06F 16/435* (2019.01)

(58) Field of Classification Search
CPC ............................. G06F 16/438; G06F 16/435
USPC ........................................................ 707/722
See application file for complete search history.

(56) References Cited

U.S. PATENT DOCUMENTS

| | | | |
|---|---|---|---|
| 2020/0302506 A1* | 9/2020 | Parker ................ | G06Q 30/0631 |
| 2021/0073293 A1* | 3/2021 | Fenton ................... | H04L 51/08 |
| 2021/0103970 A1* | 4/2021 | Sollami .................... | G06T 7/70 |
| 2021/0182934 A1* | 6/2021 | Semarjian .......... | G06Q 30/0631 |
| 2021/0192134 A1* | 6/2021 | Yue ..................... | G06F 3/04895 |

* cited by examiner

*Primary Examiner* — Kimberly L Wilson

(57) ABSTRACT

A method for presenting interactive information, an electronic device, and a non-transitory computer-readable storage medium are provided. The method includes: receiving query information input by a user; identifying, based on the query information and personalized information corresponding to the user, a query intention corresponding to the query information; determining a scene breakdown corresponding to the query information, and recalling, based on the query intention and the scene breakdown, a target object corresponding to the query information and associated objects associated with the target object; combining the target object and the associated objects according to a combination manner of the target object and the associated objects, to obtain a recall object information set corresponding to the query information; and generating multiple multimedia contents corresponding to the recall object information set using a pre-trained generative model, and presenting the multiple multimedia contents in an information display interface.

16 Claims, 6 Drawing Sheets

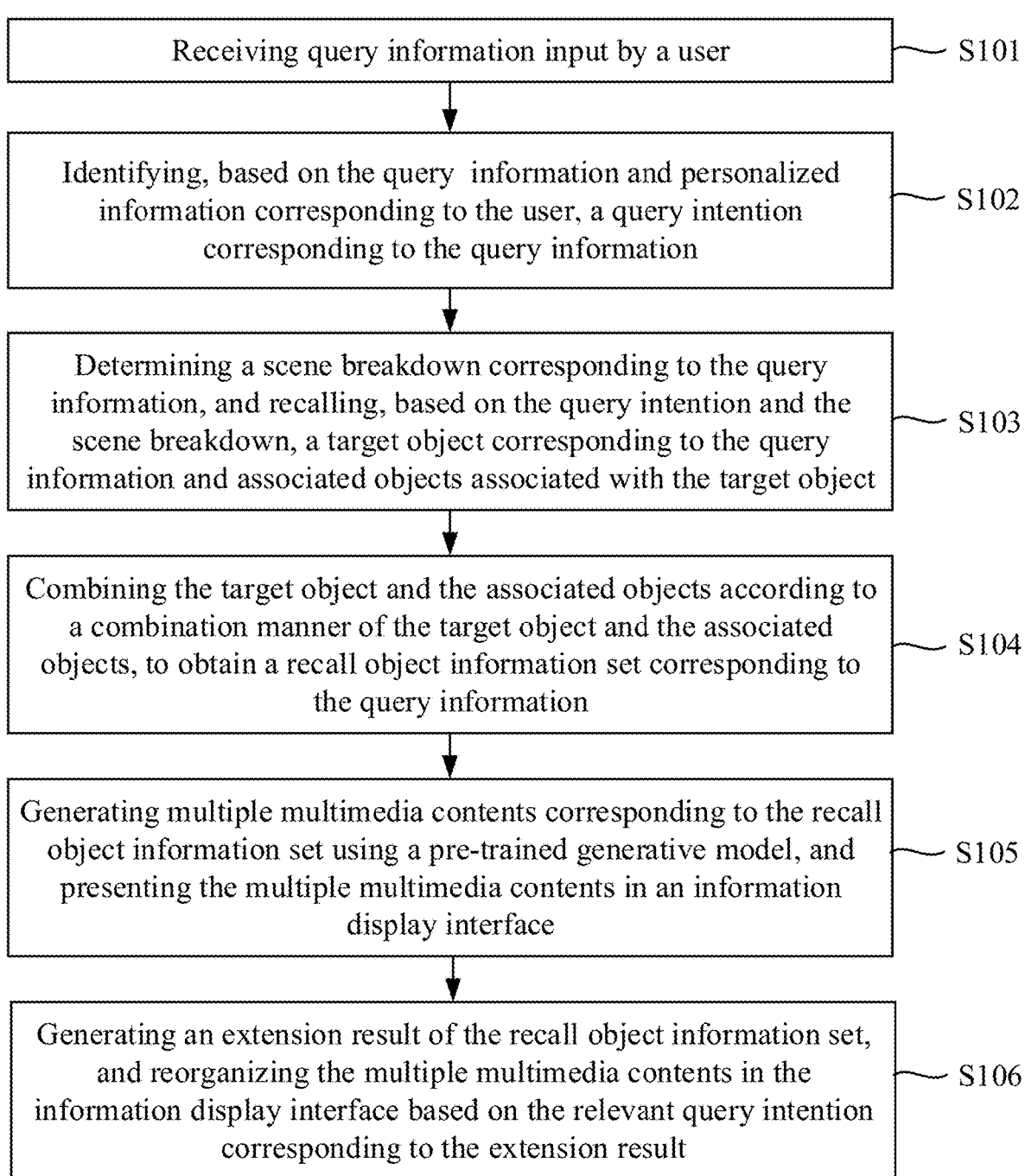

Receiving query information input by a user — S101

Identifying, based on the query information and personalized information corresponding to the user, a query intention corresponding to the query information — S102

Determining a scene breakdown corresponding to the query information, and recalling, based on the query intention and the scene breakdown, a target object corresponding to the query information and associated objects associated with the target object — S103

Combining the target object and the associated objects according to a combination manner of the target object and the associated objects, to obtain a recall object information set corresponding to the query information — S104

Generating multiple multimedia contents corresponding to the recall object information set using a pre-trained generative model, and presenting the multiple multimedia contents in an information display interface — S105

Generating an extension result of the recall object information set, and reorganizing the multiple multimedia contents in the information display interface based on the relevant query intention corresponding to the extension result — S106

FIG. 8

METHOD FOR PRESENTING INTERACTIVE INFORMATION, ELECTRONIC DEVICE AND STORAGE MEDIUM

TECHNICAL FIELD

The present disclosure relates to the field of Internet technologies, and in particular, to a method for presenting interactive information, an electronic device and a storage medium.

BACKGROUND

With the development of network technologies and the popularization of intelligent terminal devices, people are increasingly accustomed to using various search platforms to search for information, for example, searching for commodity information, educational resources, service resources, fashion matching, gift recommendations, etc. Existing search engines typically return a large amount of web links and information, which forces users to spend a lot of time to read and filter relevant content.

In addition, existing search engines often cannot fully understand the user's context and exact needs, resulting in search results that are independent and lack relevance to one another. Additionally, the existing search platforms rely on keywords contained in the user-input query information, aiming to find the most relevant single result and display related search results ranked by relevance. However, the contextual and vague needs of many users are difficult to express accurately through simple keywords, and what users actually need is a comprehensive solution, not just some related individual search results. Therefore, existing search platforms are unable to meet the demand for comprehensive solutions to complex problems.

SUMMARY

The present disclosure provides a method for presenting interactive information, an electronic device and a storage medium, which can meet comprehensive solution needs of users for complex problems and improve the comprehensiveness of interactive information presentation.

According to a first aspect, the present disclosure provides a method for presenting interactive information, which includes:

receiving query information input by a user;

identifying, based on the query information and personalized information corresponding to the user, a query intention corresponding to the query information;

determining a scene breakdown corresponding to the query information, and recalling, based on the query intention and the scene breakdown, a target object corresponding to the query information and associated objects associated with the target object;

combining the target object and the associated objects according to a combination manner of the target object and the associated objects, to obtain a recall object information set corresponding to the query information; and generating multiple multimedia contents corresponding to the recall object information set using a pre-trained generative model, and presenting the multiple multimedia contents in an information display interface.

According to a second aspect, the present disclosure provides an electronic device, which includes at least one processor and a memory. The memory is coupled to the at least one processor and stores computer executable instructions thereon, which when executed by the at least one processor, cause the at least one processor to perform the aforementioned method for presenting interactive information.

According to a third aspect, the present disclosure provides a non-transitory computer-readable storage medium storing computer programs which, when executed by a processor, cause the processor to perform the aforementioned method for presenting interactive information.

BRIEF DESCRIPTION OF THE DRAWINGS

To illustrate the technical solutions in the embodiments of the present disclosure more clearly, the following briefly introduces the accompanying drawings required for describing the embodiments. Apparently, the accompanying drawings described below are merely some embodiments of the present disclosure, and those skilled in the art may derive other drawings from these accompanying drawings without creative efforts.

FIG. 8 is another schematic flowchart of a method for presenting interactive information according to some embodiments of the present disclosure.

DETAILED DESCRIPTION

The technical solutions in the embodiments of the present disclosure will be clearly and completely described below with reference to the accompanying drawings. Apparently, the described embodiments are merely some but not all of the embodiments of the present disclosure. Based on the embodiments in the present disclosure, all other embodiments obtained by those skilled in the art without creative efforts shall fall within the scope of protection of the present disclosure.

The present disclosure provides a method for presenting interactive information, an electronic device and a storage medium, which can meet the comprehensive solution needs of users for complex problems and improve the comprehensiveness of interactive information presentation.

The method for presenting interactive information may be applied to electronic devices, such as servers or terminals.

The server may include an independently running server, a distributed server, a server cluster composed of multiple servers, etc. The terminal may include a smartphones, a tablet computer, a personal computer (PC), a mobile Internet devices (MID), etc.

The method for presenting interactive information includes: receiving query information input by a user; identifying, based on the query information and personalized information corresponding to the user, a query intention corresponding to the query information; determining a scene breakdown corresponding to the query information, and recalling, based on the query intention and the scene breakdown, a target object corresponding to the query information and associated objects associated with the target object; combining the target object and the associated objects according to a combination manner of the target object and the associated objects, to obtain a recall object information set corresponding to the query information; and generating multiple multimedia contents corresponding to the recall object information set using a pre-trained generative model, and presenting the multiple multimedia contents in an information display interface.

The method for presenting interactive information, the electronic device, and the storage medium in the embodiments of the present disclosure will be described in detail below with reference to FIGS. 1 to 9. It should be noted that the order of description of the following embodiments is not intended to limit the priority order of the embodiments.

Figure 1:
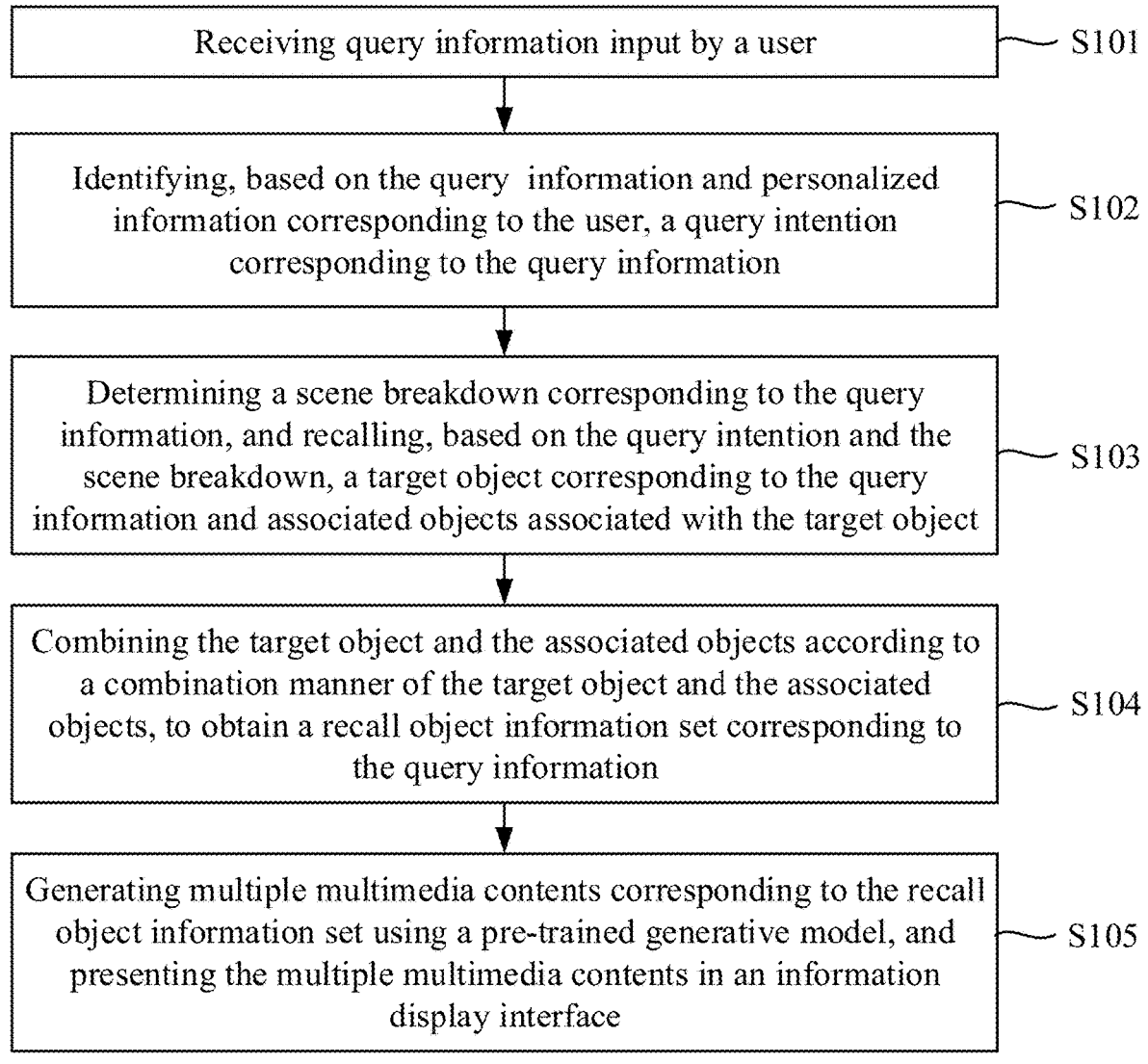
FIG. 1 is a schematic flowchart of a method for presenting interactive information according to some embodiments of the present disclosure.

FIG. 1 is a schematic flowchart of a method for presenting interactive information according to some embodiments of the present disclosure. As shown in FIG. 1, the method includes the following steps.

S101, receiving query information input by a user.

For example, a search engine can provide a front-end interactive interface that supports multimodal user input, allowing users to input query information in various manners, such as text, voice, images, videos, links, etc. The front-end interactive interface can specifically include elements such as a text search box, a voice input control, an image upload control, a video upload control, etc.

Query information is a search request submitted by a user through the multimodal front-end interactive interface provided by the search engine, used to find specific data, information, or knowledge. The query information can include keywords, phrases, questions, or any content that can express the user's information needs. The query information may be in a text form, such as a keyword entered in a text search box; or in a voice form, such as a query made through a voice assistant; or in an image form, such as an uploaded image for image-based searches; or be a link. The form of the query information is not specifically limited herein.

Figure 2:
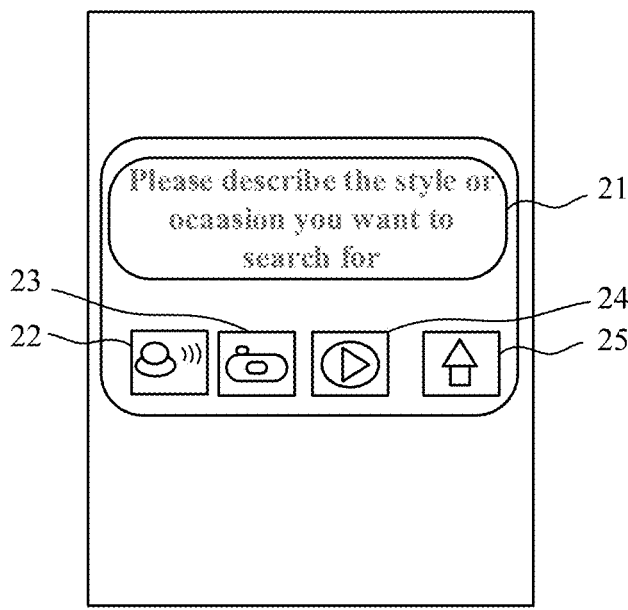
FIG. 2 is a schematic diagram of a front-end interactive interface according to some embodiments of the present disclosure.

FIG. 2 is a schematic diagram of a front-end interactive interface according to some embodiments of the present disclosure. As shown in FIG. 2, the front-end interactive interface includes a text search box 21, a voice input control 22, an image upload control 23, a video upload control 24, and a confirm control 25. Users can enter query text in the text search box 21, and then click the confirm control 25 to search for the query text. Users can also input voice by long-pressing or clicking the voice input control 22. An information display system will convert the input voice into text and display the corresponding text in the text search box. Then, users can click the confirm control 25 to search for the input voice. It can be understood that the text corresponding to the input voice displayed in the text search box can be edited by the user, such as adding or deleting text.

Users can also upload images by clicking the image upload control 23, which can be captured in real-time or pre-saved locally. After receiving the image, the information display system identifies objects in the image, such as items, background, and/or style of the image, and can then search based on the recognition results. Similarly, users can also upload a video by clicking the video upload control 24, which can be captured in real-time or pre-saved locally. After receiving the video, the information display system identifies objects such as items, background, and/or style of images in each frame of the video, and can then search based on the recognition results.

It can be understood that since the embodiments of the present disclosure support multimodal searches, users can enter text in the text search box while uploading images or videos.

Please continue to refer to FIG. 2, users can enter "white dress" in the text search box 21 while uploading an image of a dress through the image upload control 23. The information display system can then search based on the query text and the query image.

In addition, in some embodiments of the present disclosure, after the user inputs multimodal query information through the front-end interactive interface, the front-end interactive interface can be switched to an intent assisted interface to facilitate an auxiliary recognition of the intent of the query information.

Figure 3:
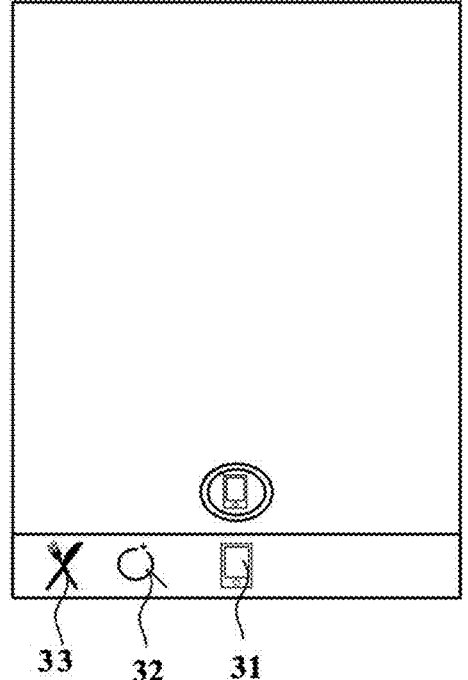
FIG. 3 is another schematic diagram of a front-end interactive interface according to some embodiments of the present disclosure.

For example, please refer to FIG. 3, if the user inputs query information for apples, the query information includes three intentions: querying mobile phones, querying fruits, and querying nutritional information. Therefore, interactive buttons 31, 32, and 33 can be displayed on the intent assisted interface. Optionally, the interactive button 31 corresponds to the intention of querying mobile phones, the interactive button 32 corresponds to the intention of querying fresh apple prices, and the interactive button 33 corresponds to the intention of querying nutritional information of apples. The user can click the corresponding interactive button according to actual needs. After clicking the corresponding interactive button, the intention corresponding to the interactive option can be added to personalized information for subsequent intention recognition.

S102, identifying, based on the query information and personalized information corresponding to the user, a query intention corresponding to the query information.

The query intention refers to specific goals or purposes that a user wants to achieve when submitting a query. The query feature is data converted from the user's query information, which can be processed by computers. Personalized information refers to data related to a specific user, which can be used to customize and optimize the user experience. In information retrieval, recommendation systems, and search engines, personalized information can help the system better understand user needs and preferences, thereby providing more accurate and personalized services. Personalized information can include user behavior data, user preference settings, user feedback, user social data, user usage habits, and user personal information, etc. Specifically, personalized information can be collected through methods such as user behavior tracking, questionnaire surveys, user registration information, etc. Before users use the search platform, personalized information can be obtained through information surveys or interactive interactions. For example, through interface inquiries, the user's gender, location, and areas of interest (such as sports or music), etc., can be determined.

Taking query information in text form as an example, an algorithm of Word2Vec can be used to convert the user's query text into a query feature. Then, relevant features can be extracted from the personalized information and combined with the query feature. Finally, the query intention corresponding to the query information can be identified based on the combination results.

In some embodiments of the present disclosure, the step of "identifying, based on the query information and personalized information, a query intention corresponding to the query information" may specifically include:

obtaining a query feature corresponding to the query information;

extracting personalized features associated with user intentions from the personalized information;

integrating the personalized features to the query feature to obtain an enhanced query feature; and identifying the query intention corresponding to the query information based on the enhanced query feature.

In these embodiments, after obtaining the query feature corresponding to the query information and the personalized information corresponding to the user, features that help identify the user's intention can be extracted from the user's personalized information, such as the most commonly searched keywords and the most interesting topics. Then, the query feature and the personalized feature vector are integrated into a longer vector, that is, an enhanced query feature, which contains the semantic information of the original query and the personalized information of the user. Then, the query intention corresponding to the enhanced query feature can be identified through intent recognition models based on Transformer architecture or large language models.

Through this process, the system can accurately identify the user's query intention by combining the user's query content and personalized information.

It can be understood that in the present disclosure, the user's input supports multimodal input. Therefore, the query information can not only include query text, but also a query image. Optionally, in some embodiments of the present disclosure, the step of "obtaining a query feature corresponding to the query information" may specifically include:

extracting the query text and the query image from the query information; and processing the query text and the query image using a preset processing model to obtain the query feature corresponding to the query information.

In order to further improve the accuracy and comprehensiveness of subsequent information presentation, after obtaining the enhanced query feature, a pre-trained intent recognition model can be used to perform intent recognition processing on the enhanced query feature. Then, by combining real-time user data, the query intention of the query information can be determined from the intent recognition results.

Optionally, in some embodiments of the present disclosure, the step of "identifying the query intention corresponding to the query information based on the enhanced query feature" may specifically include:

performing intent recognition processing on the enhanced query feature using a pre-trained intent recognition model, to obtain an intent recognition result corresponding to the enhanced query feature; and determining, based on real-time user data contained in the personalized information, the query intention corresponding to the query information from the intent recognition result.

In these embodiments, the enhanced query feature is subjected to intent recognition processing through a pre-trained intent recognition model, and an intent recognition result is output, which can be a probability distribution indicating the likelihood of different intents. Then, by incorporating real-time user data from personalized information such as current location, time, device type, etc., additional context can be provided to help determine the user's intention. For example, if a user searches for "seaside" during summer and is located in a coastal city, this indicates that the user is looking for nearby beaches. Thus, the results from the intent recognition model can be combined with the user's personalized information to further refined the user's query intention. If the intent recognition model predicts that the user may be looking for information about "seaside vacations", and the user's personalized information shows that they are interested in high-end resorts, then the final determined query intention may be "seeking high-end beachfront resorts".

For example, a user submits a query request "I want a lightweight jacket suitable for spring", and the user's personal information shows a preference for fashionable casual styles, frequently purchasing mid-to-high-end brand clothing, and the user's search history records indicate that the user is interested in outdoor activity equipment. Pre-trained NLP models (such as BERT model) can be used to convert the query text into a text vector. Assuming that the user also uploads a reference image of the jacket type he or she wants, a pre-trained image recognition model can be used to convert the image into an image vector. The text vector and the image vector are then integrated to form an enhanced query feature. Next, a pre-trained intent recognition model (e.g., Transformer) can be used to process the enhanced query feature to obtain intent recognition result. Finally, considering the user's real-time preferences and historical behavior, it can be inferred that the user is looking for a lightweight jacket suitable for spring outdoor activities. Based on the user's brand preferences and style preferences, the recognition results may be refined to "seeking mid-to-high end brand lightweight jackets suitable for spring outdoor activities".

S103, determining a scene breakdown corresponding to the query information, and recalling, based on the query intention and the scene breakdown, a target object corresponding to the query information and associated objects associated with the target object.

The scene breakdown refers to a process of analyzing and deconstructing the information in the query information, with the aim of extracting key contextual information from the query in order to construct a specific usage scenario. The target object refers to the specific information, data, or content directly associated with the query request submitted by the user. The target object is the result retrieved by the search engine from a database or a knowledge base based on the user's query intention. The associated objects refer to other information or data that are directly or indirectly related to the user's target object, enriching the query results and providing a more comprehensive view of information for the user. For example, if the target object is a jacket, its associated objects may include jacket brands, prices, matching suggestions, washing guidelines, and so on.

For example, NLP techniques such as word segmentation, part-of-speech tagging, syntactic analysis, etc., are used to analyze the user's query sentence, to identify keywords and entity words in the query. For example, in a query "spring new jacket", "spring" and "jacket" are keywords. Machine learning models, such as support vector machines (SVM), neural networks, etc., can be used to classify the query intention. Then the main purpose of the user's query, such as searching for products, obtaining information, or comparing prices, etc., can be determined. Based on the identified query intention and determined scene breakdown, information directly related to the query can be retrieved from the database. For the query "spring new jacket", all product information about new spring jackets can be recalled. Association rules between the target object and potential associated objects can be defined based on business logic and domain knowledge. For jackets, associated objects may include matching suggestions, user reviews, brand stories, maintenance guides, etc. Associated objects related to the target object can be retrieved from the database or the knowledge base based on these association rules. For example, clothing items such as pants, shoes, etc., that match the selected jacket can be recalled. Optionally, in some embodiments of the present disclosure, the associated objects can be adjusted based on the user's personalized information to provide more personalized recommendations. For example, if the user prefers a certain color or style, related matching suggestions may be prioritized for display.

Optionally, in some embodiments of the present disclosure, the step of "recalling, based on the query intention and the scene breakdown, a target object corresponding to the query information and associated objects associated with the target object" may specifically include:

obtaining candidate objects corresponding to the query intention; and recalling the target object corresponding to the query information as well as the associated objects associated with the target object, based on the personalized information, the scene breakdown, and object information of the candidate objects.

For example, for querying "lightweight jackets suitable for spring", identify "spring" and "lightweight jackets" as key information. All potentially relevant candidate objects can be retrieved from the database based on the query intention. For "lightweight jackets", all jacket products marked as "lightweight" can be retrieved. The user's personalized information, such as search history, purchase records, preference settings, etc., can be analyzed to construct user profiles. Associated objects associated with the target object can be identified based on the characteristics of the target object and the user's personalized information. For "lightweight jackets", associated objects may include matching suggestions, recommendations for similar products, user reviews, etc. Associated objects related to the target object can be recalled from the database or the knowledge base. For example, recall clothing information such as pants and shoes that match the selected lightweight jackets, as well as user reviews and matching suggestions.

Optionally, in some embodiments of the present disclosure, the step of "determining a scene breakdown corresponding to the query information" may specifically include:

identifying an entity word contained in the query information; and constructing the scene breakdown corresponding to the query information based on the query intention and the entity word.

For example, Named Entity Recognition (NER) technology can be used to extract specific entity word from query information, such as names of people, places, organizations, times, etc. For example, if a user queries "what clothes should I wear for a trip to New York tomorrow?", the word segmentation results would be: ["tomorrow", "a trip to", "New York", "should", "wear", "what", "clothes"]; "New York" is a location entity. "New York" is identified as a location. Based on the query "what clothes should I wear for a trip to New York tomorrow?", the intention is to inquire about "weather". By combining the intention of "checking the weather" with the context of "New York" and "tomorrow", the scene breakdown can be determined to be "weather query before travel".

In this way, the system can accurately understand the user's query intention and construct a scene breakdown closely related to the user's needs, thereby providing more accurate and personalized search results.

S104, combining the target object and the associated objects according to a combination manner of the target object and the associated objects, to obtain a recall object information set corresponding to the query information.

For example, when a user submits a query "help me search for a red dress", that is, the target object is "dress". Based on fashion matching rules and user preferences, the associated objects associated with the "red dress" are determined, such as "high heels", "handbag", and "necklace". Then, based on color matching, occasion suitability, or style consistency, the "red dress" can be combined with "high heels", "handbag", and "necklace" to form a recall object information set. Optionally, in some embodiments of the present disclosure, contextual information of the user can be combined, such as the user may be looking for an outfit suitable for a specific occasion (e.g., a dinner party or wedding), and the target object and associated objects can be combined to obtain a recall object information set corresponding to the query information.

Specifically, the target object is a dress, and the associated objects are high heels, handbags, and necklaces. The combination manner is to pair the target object "dress" with the color "red", and consider matching it with "high heels", "handbag", and "necklace". All red dresses are retrieved from the database and filter out high heels, handbags, and necklaces that match them according to fashion matching rules. The recalled dress information may includes images, brands, user reviews, and/or prices, as well as information on the matching high heels, handbags, and necklaces.

In some embodiments of the present disclosure, the step of "combining the target object and the associated objects according to a combination manner of the target object and the associated objects, to obtain a recall object information set corresponding to the query information" may specifically include:

obtaining a first object feature corresponding to the target object and second object features corresponding to the associated objects; and combining, based on the personalized information and the combination manner of the target object and the associated objects, the first object feature and the second object features to obtain the recall object information set corresponding to the query information.

In these embodiments, the first object feature may be attributes and information directly related to the target object, while the second object features may be attributes and information directly related to the associated objects. For example, the target object is a "red dress", whose features include color (red), material (cotton), etc. The associated objects are "high heels" and "handbag", whose features include the style (thin high heels) and color (black) of the high heels, as well as the material (leather) and capacity (medium) of the handbag. Then, construct a recall object information set that includes the "red dress" and its matching "high heels" and "handbag".

In some embodiments of the present disclosure, the step of "combining, based on the personalized information and the combination manner of the target object and the associated objects, the first object feature and the second object features to obtain the recall object information set corresponding to the query information" may specifically include:

combining the first object feature and the second object features based on the combination manner of the target object and the associated objects, to obtain a feature combination set of the first object feature and the second object features;

determining a feature combination preference corresponding to the personalized information from the feature combination set;

determining a display weight for each feature combination in the feature combination set based on the feature combination preference and the query intention; and generating the recall object information set corresponding to the query information based on the display weights and the feature combination set.

In this embodiment, first, based on the logical relationship between the target object and the associated objects, the first object feature and the second object features are combined into a feature combination set. For example, when a user queries "red dress", the first object feature would be the color and style of the dress, while the second object features would be the color and style of the matching shoes and bags. Then, the user's personalized information, such as historical behavior, is analyzed to determine the user's preferences for different feature combinations. Based on their personalized information, a feature combination that users prefer can be identified. For example, if a user frequently checks dresses paired with high heels, then high heels would be a preferred feature combination for the user. A display weight is assigned to each feature combination in the feature combination set based on the user's feature combination preference, indicating the relative importance of the combination in the final display. It should be noted that weights can be dynamically adjusted based on users' latest behaviors and feedback to ensure that the displayed content always meets users' latest preferences. By integrating the feature combination set with the display weights, a recall object information set corresponding to query information is generated. The recall object information set will include detailed information about the target object and the associated objects, as well as their visual elements. Finally, the recall object information set is sorted based on the display weights, prioritizing the feature combination with higher display weight.

S105, generating multiple multimedia contents corresponding to the recall object information set using a pretrained generative model, and presenting the multiple multimedia contents in an information display interface.

Multimedia content refers to the combination of information content in different media forms, including elements such text, images, audio, video, etc. Displaying multiple multimedia contents in an information display interface is a dynamic and visual way of presenting content, which can offer a rich and continuous user experience.

For example, if a user searches for "spring new fashion", the selected images or videos of the spring new clothing will be displayed in the information display interface as the focus of the media stream. Specifically, this can be done through a waterfall layout to display related outfits, accessory recommendations, and fashion bloggers' style suggestions related to "spring new fashion". Users can click on any clothing image to view more details or swipe to browse additional styling suggestions. The content in the media stream is dynamically updated based on user clicks and browsing behavior, displaying more clothing styles that may interest the user. This approach meets the user's needs for comprehensive solutions to complex queries, improving the completeness of the information display.

Figure 4:
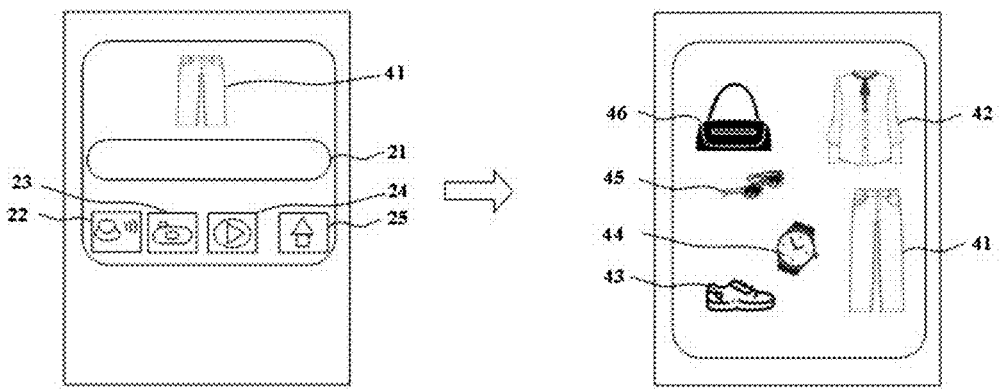
FIG. 4 is a schematic diagram of an information display interface according to some embodiments of the present disclosure.

For example, as shown in FIG. 4, a user uploads a pair of jeans and enters "how to match jeans" in the text search box. Computer vision technology can be used to identify the style, color, and other features of the uploaded jeans (i.e., target object 41). Natural language processing may be applied to the user's query "how to match jeans", extract keywords such as "match" and "jeans". Then, associated objects related to jeans matching, such as tops 42, shoes 43, watches 44, sunglasses 45, and handbags 46, etc., are recalled. The user's uploaded image of the jeans may be integrated with the multimedia contents of the recalled matching suggestions (e.g., images, videos, 3D models). Finally, the integrated visual elements are arranged into a media stream, forming a coherent styling suggestion.

Optionally, in some embodiments of the present disclosure, the recommended matching suggestions can be adjusted based on the user's personalized information and historical behavior.

Optionally, in some embodiments of the present disclosure, more fitting matching suggestions can be provided by incorporating the user's real-time contextual information, such as the current season, fashion trends, etc.

Optionally, in some embodiments of the present disclosure, the information display method may also include:

in response to a user's element addition operation, determining a visual element corresponding to the element addition operation; and generating a personalized element library corresponding to the user based on the visual element.

For example, a user can search for jeans, tops, and sunglasses at once, and then the visual elements corresponding to jeans, tops, and sunglasses are recalled. The user selects the relevant visual elements, and in response to the user's element addition operation, the visual element corresponding to the operation is determined. Finally, the user can add these visual elements to their personal collection, forming a complete styling or lifestyle set.

Optionally, in some embodiments of the present disclosure, the information display method may also include:

obtaining multimedia materials corresponding to an element splicing operation;

generating personalized materials; and splicing, based on the element splicing operation, the personalized materials and the multimedia materials to obtain personalized spliced multimedia element.

For example, first receiving user input (such as text description or voice input) to identify the user's current emotional state. Then, obtain multimedia materials related to the user's uploaded mood, or retrieve multimedia materials from the database that match the user's description. Specifically, the user can click a splicing button in the information display interface to trigger the element splicing operation. Next, personalized materials reflecting the user's emotions and personality are generated by combining the user's mood and uploaded item images. Finally, image editing techniques are used to splice the personalized materials together with the user's uploaded item images, forming a collage.

Optionally, in some embodiments of the present disclosure, the method for presenting interactive information may further include:

in response to an embedding operation for the target object, presenting an embedded object corresponding to the embedding operation; and embedding visual elements corresponding to the target object into the embedded object.

The embedded object refers to an object or an entity created and presented in a digital environment. For example, users can select or upload a target object they are interested in, such as a piece of clothing or an accessory, and request a virtual try on (such as triggering an embedding operation through an embedded button on the interface). A virtual mannequin (i.e., embedded object), which can be a 3D model or a 2D image, is then displayed. Finally, image processing is used to integrate the visual elements with the virtual mannequin, allowing the visual elements to be "worn" by the virtual model.

Optionally, in some embodiments of the present disclosure, after embedding the visual elements corresponding to the target object into the embedded object, the method may further include:

dynamically presenting the embedded object that contains the visual elements corresponding to the target object.

Specifically, a graphics rendering engine can be used to render an embedded scene in real-time, ensuring that users can see the real-time changes, such as the effect of clothes being worn on a mannequin in real-time, including wrinkles and changes in light and shadow.

Optionally, in some embodiments of the present disclosure, the method may further include:

presenting comparison information between each multimedia content in the recall object information set.

For example, users searching for smartphones can collect detailed data on different smartphone models from the recall object information set. Analyze the data and generate a comparison table (i.e. comparison information), listing the performance of each mobile phone on key features.

Optionally, in some embodiments of the present disclosure, after the step of "generating multiple multimedia contents corresponding to the recall object information set using a pre-trained generative model, and presenting the multiple multimedia contents in an information display interface", the method may further include:

in response to a content editing operation on the information display interface, editing the multiple multimedia contents and/or generating adjustment suggestions for the query information.

Figure 5:
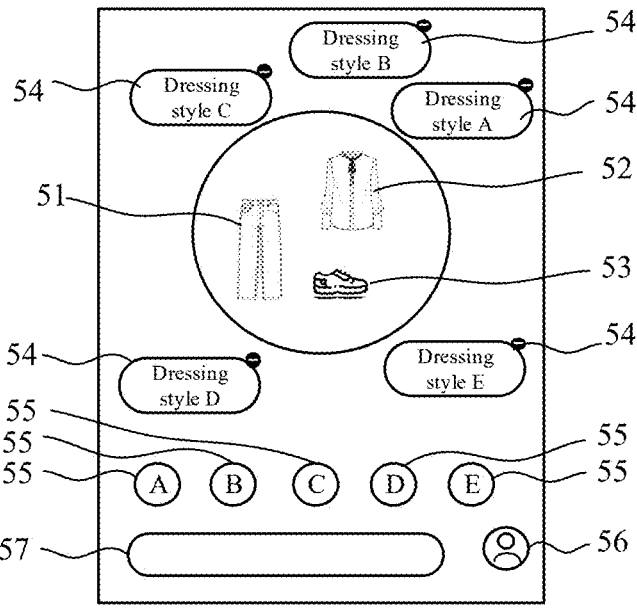
FIG. 5 is another schematic diagram of the information display interface according to some embodiments of the present disclosure.

For example, referring to FIG. 5, taking the display of a multimedia content on the information display interface as an example, the multimedia content is a user's search for dressing suggestions, including pants 51, tops 52, and shoes 53. If the user is not satisfied with the multimedia content, they can edit it by clicking on the content editing items 54 in the information display interface. The content editing item 54 is associated with the multimedia content, that is, if the multimedia content is a dressing suggestion, then each content editing item 54 corresponds to a dressing style. Furthermore, each content editing item 54 corresponds to a content editing button 55, and users can select the corresponding dressing style by clicking on the content editing button 55. In addition, users can also input their custom query intention through an intent input box 57 to supplement the query information with intent. In the information display interface, personalized labels 56 of the user can also be displayed, which present the results of the user's personalized attribute selection, such as body shape, interest preferences, gender, etc.

Figure 6:
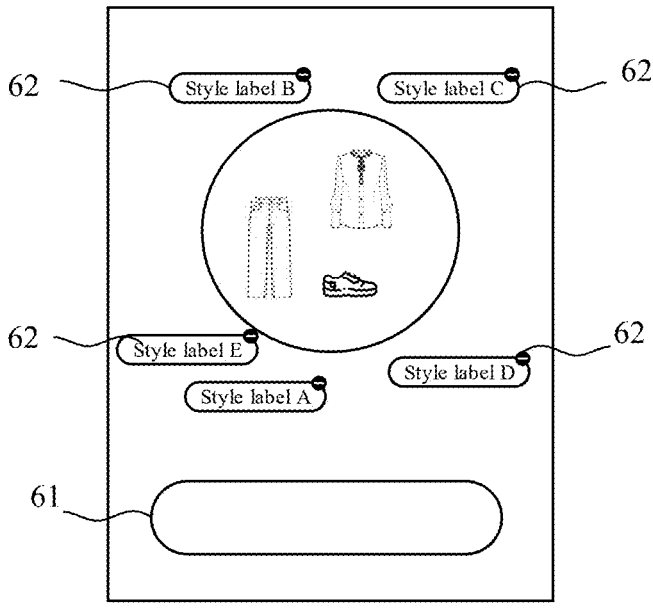
FIG. 6 is yet another schematic diagram of the information display interface according to some embodiments of the present disclosure.

For example, referring to FIG. 6, taking the display of a multimedia content on the information display interface as an example, the multimedia content is a user's search for dressing suggestions. In response to content editing operations on the information display interface, such as entering how to match in input box 61, multiple suggestion labels 62 can be generated in the preset positions of the multimedia content, such as dressing suggestions for dinners, Christmas, or commuting.

Figure 7:
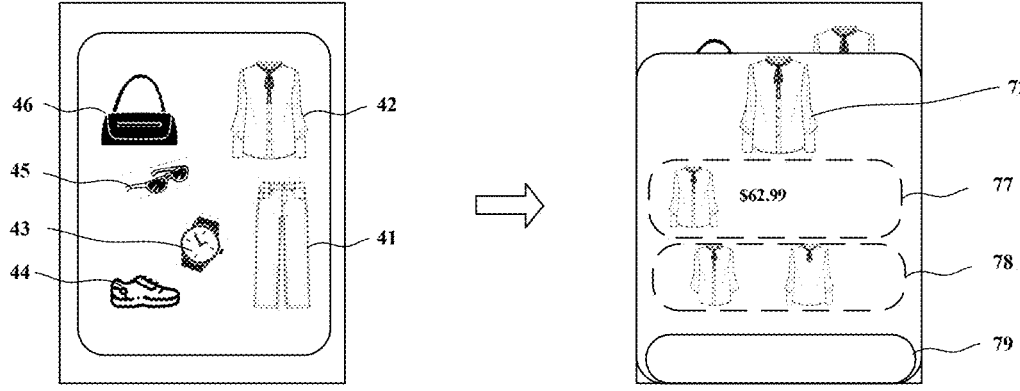
FIG. 7 is a schematic diagram of an object information interface according to some embodiments of the present disclosure.

For example, referring to FIG. 7, after clicking on an associated object 72, the user can switch the information display interface to an object information interface, which displays detailed information 77 of the associated object 72, similar results 78 of the associated object 72, and also displays the try on information 79 of the associated object 72.

Optionally, in some embodiments of the present disclosure, please refer to FIG. 8. After step S105, the method may further include:

Step 106, generating an extension result of the recall object information set, and reorganizing the multiple multimedia contents in the information display interface based on the relevant query intention corresponding to the extension result.

For example, a content search technology of image recognition and large language models can be combined to process query information, so as to obtain the extension result of the recall object information set in the network, which are similar search results and/or related search results of the recall object information set. Next, determine the relevant query intentions corresponding to similar search results and/or related search results. Based on the interaction between the user and the relevant query intentions, such as selecting a relevant intention from the determined relevant intention results, and combining it with the user's input query information for secondary queries and result redrawing, achieve interactive personalized result recombination, that is, recombining multiple multimedia contents in the information display interface.

In the method for presenting interactive information provided in the embodiments of the present disclosure, user query information is subjected to intent recognition using personalized information and query information. Then, a scene breakdown corresponding to the query information is determined, and a target object and associated objects associated with the target object are recalled based on the query intention and the scene breakdown. Finally, the target object and the associated objects are combined by using a combination manner of the target object and the associated objects, to obtain a recall object information set, and then generate multiple multimedia contents corresponding to the recall object information set using a pre-trained generative model, and present the recall object information set in an information presentation interface. On the one hand, based on the query intention and the scene breakdown, the target object corresponding to the query information can be accurately searched, and on the other hand, the associated objects associated with the target object can also be extended, thereby meeting the comprehensive solution needs of users for complex problems and improving the comprehensiveness of information display.

It should be noted that the method processes described in the present disclosure are not limited to the specific steps and sequences described and illustrated. Those skilled in the art can make various changes, modifications, additions, or alter the sequence of the steps after understanding the principles of the present disclosure.

Moreover, in order to implement the method provided in the embodiments of the present disclosure, the embodiments of the present disclosure further provide an electronic device.

Figure 9:
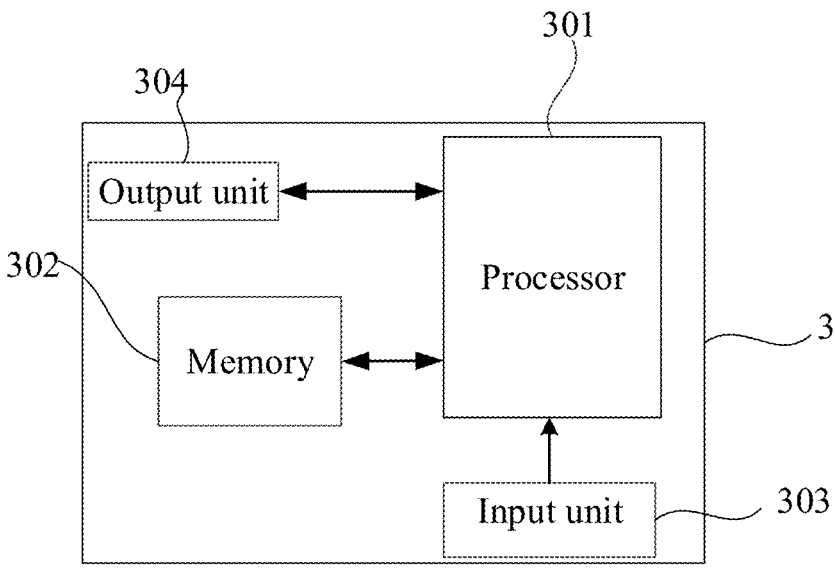
FIG. 9 is a schematic structural diagram of an electronic device according to some embodiments of the present disclosure.

FIG. 9 shows a schematic structural diagram of an electronic device according to some embodiments of the present disclosure. The electronic device 3 is intended to represent various forms of digital computers, such as, a laptop computer, a desktop computer, a workstation, a personal digital assistant, a server, a blade server, a mainframe computer, and other suitable computing devices. The electronic device 3 may also represent various forms of mobile devices, such as a personal digital assistant, a cellular phone, a smart phone, a wearable device, etc. As shown in FIG. 9, the electronic device 3 includes at least one processor 301 and a memory 302. It will be understood by those skilled in the art that the structure of the electronic device 3 shown in FIG. 9 does not constitute a limitation on the electronic device, and the electronic device 3 may include more or fewer components than those illustrated in the figure, or may combine some components, or may have a different component arrangement.

Specifically, the memory 302 may be configured to store computer programs or computer executable instructions. The memory 302 may include a program storage area and a data storage area, where the program storage area may store an operating system, application programs necessary for at least one function, etc. The data storage area may store data created based on the use of the electronic device. In addition, the memory 302 may include high-speed random access memory, as well as non-transitory memory, such as at least one of a disk storage device, a flash memory device, or other non-transitory solid-state storage devices.

The processor 301 may include a central processing unit (CPU) or an application-specific integrated circuit (ASIC), or it may be configured as one or more integrated circuits implementing the embodiments of the present disclosure. The processor 301 is a control center of the electronic device 3, which is connected to various parts of the electronic device 3 through various interfaces and lines. It executes various functions and data processing of the electronic device 3 by running or executing computer programs or computer executable instructions stored in the memory 302, as well as calling other data stored in the memory 302, thereby achieving overall control of the electronic device 3 and implementing the method for presenting interactive information described in the above embodiments.

As shown in FIG. 9, the electronic device 3 may also include an input unit 303 and an output unit 304. The input unit 303 is configured to receive input digital or character information, as well as generate signal inputs related to user settings and function controls, such as signal inputs of a touch screen, a keyboard, a mouse, etc. The output unit 304 may include a display unit, an auxiliary lighting device (e.g., a light emitting diode (LED)), and a tactile feedback device (e.g., a vibration motor), etc. The display unit may include, but is not limited to a liquid crystal display (LCD), an LED display, and a plasma display. In some implementations, the display unit may be a touch screen.

Specifically, in this embodiment, the processor 301 of the electronic device 3 is configured to read and execute the computer programs or the computer executable instructions stored in the memory 302, to implement the method for presenting interactive information provided in the foregoing method embodiments of the present disclosure. For example, the processor 301 may execute the computer programs or the computer executable instructions stored in the memory 302 to perform the following actions:

receiving query information input by a user; identifying, based on the query information and personalized information corresponding to the user, a query intention corresponding to the query information; determining a scene breakdown corresponding to the query information, and recalling, based on the query intention and the scene breakdown, a target object corresponding to the query information and associated objects associated with the target object; combining the target object and the associated objects according to a combination manner of the target object and the associated objects, to obtain a recall object information set corresponding to the query information; and generating multiple multimedia contents corresponding to the recall object information set using a pre-trained generative model, and presenting the multiple multimedia contents in an information display interface.

For specific implementation of each action described above, reference may be made to the foregoing method embodiments, and details are not repeatedly described herein.

In the solution for presenting interactive information provided in the embodiments of the present disclosure, user query information is subjected to intent recognition using personalized information and query information. Then, a scene breakdown corresponding to the query information is determined, and a target object and associated objects associated with the target object are recalled based on the query intention and the scene breakdown. Finally, the target object and the associated objects are combined by using a combination manner of the target object and the associated objects, to obtain a recall object information set, and then generate multiple multimedia contents corresponding to the recall object information set using a pre-trained generative model, and present the recall object information set in an information presentation interface. On the one hand, based on the query intention and the scene breakdown, the target object corresponding to the query information can be accurately searched, and on the other hand, the associated objects associated with the target object can also be extended, thereby meeting the comprehensive solution needs of users for complex problems and improving the comprehensiveness of information display.

Those skilled in the art may understand that all or a part of the steps of the method in the foregoing method embodiments may be completed by instructions, or by controlling related hardware through instructions. These instructions may be stored in a computer-readable storage medium, and loaded and executed by a processor.

Therefore, the embodiments of the present disclosure provide a non-transitory computer-readable storage medium, in which computer programs or computer executable instructions are stored. These computer programs or computer executable instructions can be loaded by a processor to execute the steps of the method for presenting interactive information provided by the embodiments of the present disclosure. For example, the computer programs or the computer executable instructions, when executed, may perform the following actions:

receiving query information input by a user; identifying, based on the query information and personalized information corresponding to the user, a query intention corresponding to the query information; determining a scene breakdown corresponding to the query information, and recalling, based on the query intention and the scene breakdown, a target object corresponding to the query information and associated objects associated with the target object; combining the target object and the associated objects according to a combination manner of the target object and the associated objects, to obtain a recall object information set corresponding to the query information; and generating multiple multimedia contents corresponding to the recall object information set using a pre-trained generative model, and presenting the multiple multimedia contents in an information display interface.

For specific implementation of each action described above, reference may be made to the foregoing method embodiments, and details are not repeatedly described herein.

The non-transitory computer-readable storage medium may include a read only memory (ROM), a random access memory (RAM), a magnetic disk, an optical disc, etc.

The embodiments of the present disclosure further provides a computer program product. Instructions in the computer program product, when executed by a processor of an electronic device, implement any method for presenting interactive information described in the foregoing method embodiments. For example, the instructions in the computer program product, when executed, may perform the following actions:

receiving query information input by a user; identifying, based on the query information and personalized information corresponding to the user, a query intention corresponding to the query information; determining a scene breakdown corresponding to the query information, and recalling, based on the query intention and the scene breakdown, a target object corresponding to the query information and associated objects associated with the target object; combining the target object and the associated objects according to a combination manner of the target object and the associated objects, to obtain a recall object information set corresponding to the query information; and generating multiple multimedia contents corresponding to the recall object information set using a pre-trained generative model, and presenting the multiple multimedia contents in an information display interface.

For specific implementation of each action described above, reference may be made to the foregoing method embodiments, and details are not repeatedly described herein.

Since the computer programs or the executable instructions stored in the computer-readable storage medium, as well as the instructions in the computer program product, when executed, can implement the steps of any method for presenting interactive information provided in the method embodiments of the present disclosure, both the computer-readable storage medium and the computer program product can achieve the beneficial effects that can be achieved by any method for presenting interactive information provided in the method embodiments of the present disclosure. For further details, reference can be made to the foregoing method embodiments, which are not further described herein.

The method for presenting interactive information, the electronic device, the computer-readable storage medium, and the computer program product provided in the embodiments of the present disclosure are introduced in detail in the foregoing. Specific examples have been used in this specification to describe the principles and implementations of the present disclosure. The description of the foregoing embodiments is merely used to help understand the methods and core ideas of the present disclosure. Meanwhile, those skilled in the art may make modifications to the specific implementations and application scopes based on the ideas of the present disclosure. In summary, the content of this specification should not be construed as a limitation to the present disclosure.

What is claimed is:

1. A method for presenting interactive information, comprising:

receiving query information input by a user;

identifying, based on the query information and personalized information corresponding to the user, a query intention corresponding to the query information;

determining a scene breakdown corresponding to the query information, and recalling, based on the query intention and the scene breakdown, a target object corresponding to the query information and associated objects associated with the target object;

combining the target object and the associated objects according to a combination manner of the target object and the associated objects, to obtain a recall object information set corresponding to the query information;

generating multiple multimedia contents corresponding to the recall object information set using a pre-trained generative model, and presenting the multiple multimedia contents in an information display interface;

wherein the determining a scene breakdown corresponding to the query information, comprises:

identifying an entity word contained in the query information;

constructing the scene breakdown corresponding to the query information based on the query intention and the entity word, the scene breakdown is used to construct a usage scenario; and wherein the recalling, based on the query intention and the scene breakdown, a target object corresponding to the query information and associated objects associated with the target object, comprises:

obtaining candidate objects corresponding to the query intention; and recalling the target object corresponding to the query information as well as the associated objects associated with the target object based on the personalized information, the scene breakdown, and object information of the candidate objects.

2. The method according to claim 1, wherein the identifying, based on the query information and personalized information, a query intention corresponding to the query information, comprises:

obtaining a query feature corresponding to the query information;

extracting personalized features associated with user intentions from the personalized information;

integrating the personalized features to the query feature to obtain an enhanced query feature; and identifying the query intention corresponding to the query information based on the enhanced query feature.

3. The method according to claim 2, wherein the identifying the query intention corresponding to the query information based on the enhanced query feature, comprises:

performing intent recognition processing on the enhanced query feature using a pre-trained intent recognition model, to obtain an intent recognition result corresponding to the enhanced query feature; and determining, based on real-time user data contained in the personalized information, the query intention corresponding to the query information from the intent recognition result.

4. The method according to claim 3, wherein the query information comprises query text and a query image; and the obtaining a query feature corresponding to the query information, comprises:

extracting the query text and the query image from the query information; and processing the query text and the query image using a preset processing model to obtain the query feature corresponding to the query information.

5. The method according to claim 1, wherein the combining the target object and the associated objects according to a combination manner of the target object and the associated objects, to obtain a recall object information set corresponding to the query information, comprises:

obtaining a first object feature corresponding to the target object and second object features corresponding to the associated objects, wherein the first object feature comprises attributes and information related to the target object, the second object features comprise attributes and information related to the associated objects; and combining, based on the personalized information and the combination manner of the target object and the associated objects, the first object feature and the second object features to obtain the recall object information set corresponding to the query information.

6. The method according to claim 5, wherein the combining, based on the personalized information and the combination manner of the target object and the associated objects, the first object feature and the second object features to obtain the recall object information set corresponding to the query information, comprises:

combining the first object feature and the second object features based on the combination manner of the target object and the associated objects, to obtain a feature combination set of the first object feature and the second object features;

determining a feature combination preference corresponding to the personalized information from the feature combination set;

determining a display weight for each feature combination in the feature combination set based on the feature combination preference and the query intention; and generating the recall object information set corresponding to the query information based on the display weights and the feature combination set.

7. The method according to claim 1, further comprising:

in response to a user's element addition operation, determining a visual element corresponding to the element addition operation; and generating a personalized element library corresponding to the user based on the visual element.

8. The method according to claim 1, further comprising:

obtaining multimedia materials corresponding to an element splicing operation;

generating personalized materials; and splicing, based on the element splicing operation, the personalized materials and the multimedia materials to obtain personalized spliced multimedia element.

9. The method according to claim 1, further comprising:

in response to an embedding operation for the target object, presenting an embedded object corresponding to the embedding operation; and embedding visual elements corresponding to the target object into the embedded object.

10. The method according to claim 9, wherein after embedding the visual elements corresponding to the target object into the embedded object, the method further comprises:

dynamically presenting the embedded object that contains the visual elements corresponding to the target object.

11. The method according to claim 1, further comprising:

presenting comparison information between each multimedia content in the recall object information set.

12. An electronic device, comprising:

at least one processor; and a memory, coupled to the at least one processor and storing computer executable instructions thereon, which when executed by the at least one processor, cause the at least one processor to:

receive query information input by a user;

identify, based on the query information and personalized information corresponding to the user, a query intention corresponding to the query information;

determine a scene breakdown corresponding to the query information, and recall, based on the query intention and the scene breakdown, a target object corresponding to the query information and associated objects associated with the target object; wherein to determine a scene breakdown corresponding to the query information is caused to identify an entity word contained in the query information, and construct the scene breakdown corresponding to the query information based on the query intention and the entity word, the scene breakdown is used to construct a usage scenario; wherein to recall the target object and the associated objects, the at least one processor is caused to obtain candidate objects corresponding to the query intention and recall the target object corresponding to the query information as well as the associated objects associated with the target object, based on the personalized information, the scene breakdown, and object information of the candidate objects;

combine the target object and the associated objects according to a combination manner of the target object and the associated objects, to obtain a recall object information set corresponding to the query information; and generate multiple multimedia contents corresponding to the recall object information set using a pre-trained generative model, and present the multiple multimedia contents in an information display interface.

13. The electronic device according to claim 12, wherein the at least one processor caused to identify, based on the query information and personalized information, a query intention corresponding to the query information is caused to:

obtain a query feature corresponding to the query information;

extract personalized features associated with user intentions from the personalized information;

integrate the personalized features to the query feature to obtain an enhanced query feature; and identify the query intention corresponding to the query information based on the enhanced query feature.

14. The electronic device according to claim 12, wherein the at least one processor is further caused to:

in response to a user's element addition operation, determine a visual element corresponding to the element addition operation; and generate a personalized element library corresponding to the user based on the visual element.

15. The electronic device according to claim 12, wherein the at least one processor is further caused to:

in response to an embedding operation for the target object, present an embedded object corresponding to the embedding operation; and embed visual elements corresponding to the target object into the embedded object.

16. A non-transitory computer-readable storage medium storing computer programs which, when executed by a processor, cause the processor to:

receive query information input by a user;

identify, based on the query information and personalized information corresponding to the user, a query intention corresponding to the query information;

determine a scene breakdown corresponding to the query information, and recall, based on the query intention and the scene breakdown, a target object corresponding to the query information and associated objects associated with the target object; wherein to determine a scene breakdown corresponding to the query information is caused to identify an entity word contained in the query information, and construct the scene breakdown corresponding to the query information based on the query intention and the entity word, the scene breakdown is used to construct a usage scenario; wherein to recall the target object and the associated objects, the processor is caused to obtain candidate objects corresponding to the query intention and recall the target object corresponding to the query information as well as the associated objects associated with the target object, based on the personalized information, the scene breakdown, and object information of the candidate objects;

combine the target object and the associated objects according to a combination manner of the target object and the associated objects, to obtain a recall object information set corresponding to the query information; and generate multiple multimedia contents corresponding to the recall object information set using a pre-trained generative model, and present the multiple multimedia contents in an information display interface.

\* \* \* \* \*